Sept. 30, 1969           J. B. WEST           3,469,507
LID CONSTRUCTION AND METHOD OF MANUFACTURING IT
Filed July 21, 1967
FIG. 1.
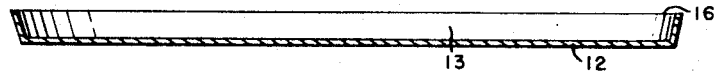
FIG. 2.
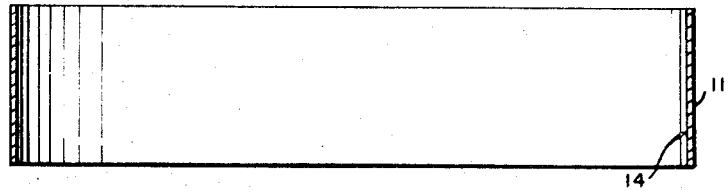
FIG. 3.
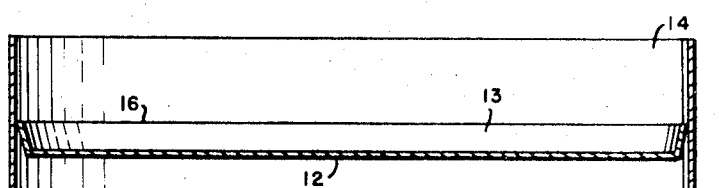
FIG. 4.
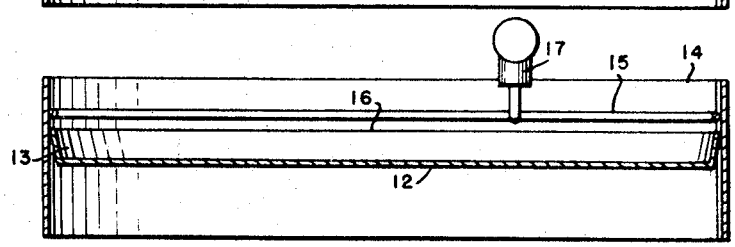
FIG. 5.
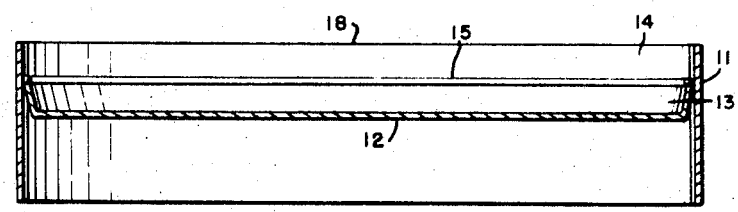
FIG. 6.
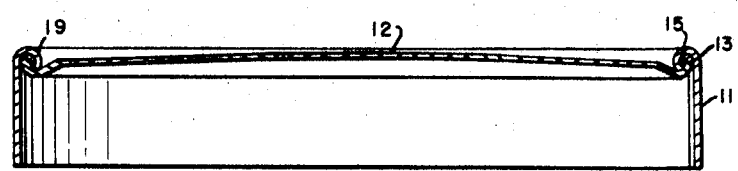
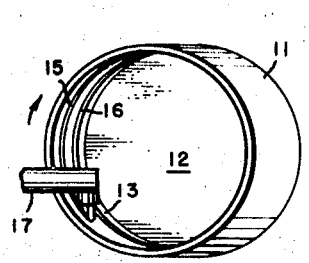
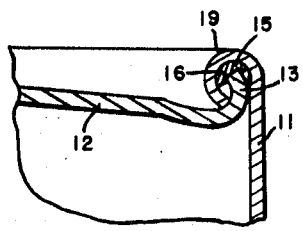
FIG. 7.
FIG. 8.
INVENTOR
JOHN B. WEST
BY *Albert J. Kramer*
ATTORNEY United States Patent Office 3,469,507
Patented Sept. 30, 1969

3,469,507
LID CONSTRUCTION AND METHOD OF
MANUFACTURING IT
John B. West, Pikesville, Md., assignor to Maryland Cup
Corporation, Owings Mills, Md., a corporation of
Maryland
Filed July 21, 1967, Ser. No. 655,096
Int. Cl. B31d 17/60
U.S. Cl. 93—39.1                                  5 Claims

ABSTRACT OF THE DISCLOSURE

A cardboard lid is made by joining the flange of a disc to an overlapping and beaded marginal portion of a cylindrical member with glue between the outer edge of the flange and the inner wall of the marginal portion. The glue, typically, may be applied by placing a nozzle on the inside of the cylinder and rotating the cylinder relative to the nozzle as the glue is discharged therethrough. This places the glue between surfaces which are conventionally not printed or treated in a way to adversely affect the adhesion of the glue and permits the use of less cardboard material.

---

This invention relates to lids and it is more particularly concerned with skirt type lids of cardboard used to close the ends of cylindrical containers and to a method of manufacturing them.

An object of the invention is the provision of a novel cardboard lid of the general type mentioned and to a new method of assembling the parts thereof.

Prior methods of manufacturing such lids comprised placing a flanged cardboard disc within a cardboard cylinder adjacent one end of the cylinder and then rolling the end of the cylinder together with the flange of the disc to form a joint between them. This produced a lid of considerable weakness that permitted loosening of the disc and cylinder easily relative to each other. Under certain conditions, the rolled end had a tendency to partially unroll under relatively weak forces. In cases, for example, of a frozen confection in the container, the disc part sometimes adhered by freezing to the confection, whereupon lifting of the cylindrical part of the lid would disengage these two parts from each other.

Hence, a specific object of the invention is the provision of a lid which can successfully resist such tendencies.

A further specific object of the invention is the provision of such a lid in which the disc is glued to the cylindrical member along surfaces of both the cylinder and the disc which do not ordinarily affect the adhesion of the glue adversely, such as might occur by an overprinting on the outside of the lid and other surface treatments.

A still further object is the provision of a lid of the type mentioned which requires less material for its manufacture.

These and still further objects, advantages and features of the invention will appear more fully from the following description considered together with the accompanying drawing which illustrates an embodiment of the invention.

In the drawing:
FIG. 1 is a cross sectional view of a flanged cardboard disc member comprising one of the elements of the embodiment.
FIG. 2 is a cross sectional view of a paper cylinder comprising a second element of the embodiment.
FIG. 3 is a cross sectional view illustrating a preliminary position of the flanged disc within the cylinder as a step in the method of manufacturing the lid.
FIGS. 4, 5 and 6 are diagrammatic sectional views of the cylinder and lid in subsequent steps in the method of manufacturing the lid.
FIG. 7 is an enlarged fragmentary view of a portion of FIG. 6.
FIG. 8 is a perspective view of the parts in the relative positions of FIG. 4.

Referring with more particularity to the drawing in which like numerals designate like parts, the embodiment is illustrated in relation to a conventional cardboard cylinder 11 and a conventional flanged cardboard disc 12.

The flanged disc 12 is disposed within the cylinder 11, the annular flange 13 thereof being bent at an obtuse angle so that its outer edge presses outwardly against the inner wall 14 of the cylinder.

The next step of the method comprises placing glue, preferably in the form of a ring 15, on the inner wall 14 in spaced relation to the outer edge 16 of the flange 13. The ring 15 may either be subdivided or continuous, as shown. This may conveniently be done by rotating the cylindrical member relative to a stationary glue nozzle 17. See FIG. 8. Conversely, the nozzle may be revolved relative to the cylindrical member.

The flanged disc is then moved relative to the cylinder axially so that the edge 16 of the flange contacts the ring of glue and the flange is in a position relative to the facing end 18 of the cylinder sufficient to permit the rolling of a marginal edge adjacent the end 18 in overlapping relation to the flange 13 to form a beaded interlock 19.

As a result, the glue ring is disposed between the outer end 16 of the flange and a portion of the inner wall of the cylinder. A firm seal is effected between these parts, because the outer edge 16 is a raw edge of paper that tenaciously adheres to glue and the inner wall of the cylinder is ordinarily not printed for reasons of sanitation and not coated with anything that would be incompatible with the glue or which would adversely affect its adhesive properties. Also, less cardboard material is required, inasmuch as less material is needed for the bead 19 and flange 13 than is needed in conventionally made lids that require a beading of the combined marginal end of the cylinder and flange.

I claim:
1. The method of manufacturing a lid comprising disposing a disc with a flange within a hollow cylinder, placing glue on the inner wall of the cylinder in contact with the outer edge of the flange, rolling a marginal portion of the cylinder adjacent the flange to overlap the flange and cause the glue to contact the inner wall of the rolled marginal portion.
2. The method as defined by claim 1 in which the glue is disposed on the inner wall of the cylinder in spaced relation to the outer end of the flange, and the disc is then moved axially relative to the cylinder to a position adjacent a marginal portion of the cylinder in an amount sufficient to cause the flange to contact and adhere to the glue.

3. The method as defined by claim 1 in which the glue is placed on the inner wall of the cylinder in the form of a ring.

4. The method as defined by claim 1 in which the glue is placed on the inner wall in a continuous and endless strip.

5. The method as defined by claim 1 in which the glue is placed on the inner wall in a subdivided form.

References Cited

UNITED STATES PATENTS

| | | | |
|---|---|---|---|
| 3,028,798 | 4/1962 | Allen. | |
| 3,229,595 | 1/1966 | Waycie | 93—39.1 |
| 3,311,033 | 3/1967 | Felton et al. | 93—39.1 |
| 3,322,045 | 5/1967 | Tanona | 93—39.1 |

BERNARD STICKNEY, Primary Examiner

U.S. Cl. X.R.

53—40; 229—5.6